July 8, 1969
K. H. EMICH
3,454,221
AUTOMATIC RESET FOR GALVANOMETER CONTROLLER
FOR USE WITH EXTRUSION APPARATUS
Filed Nov. 23, 1966
Sheet 1 of 2
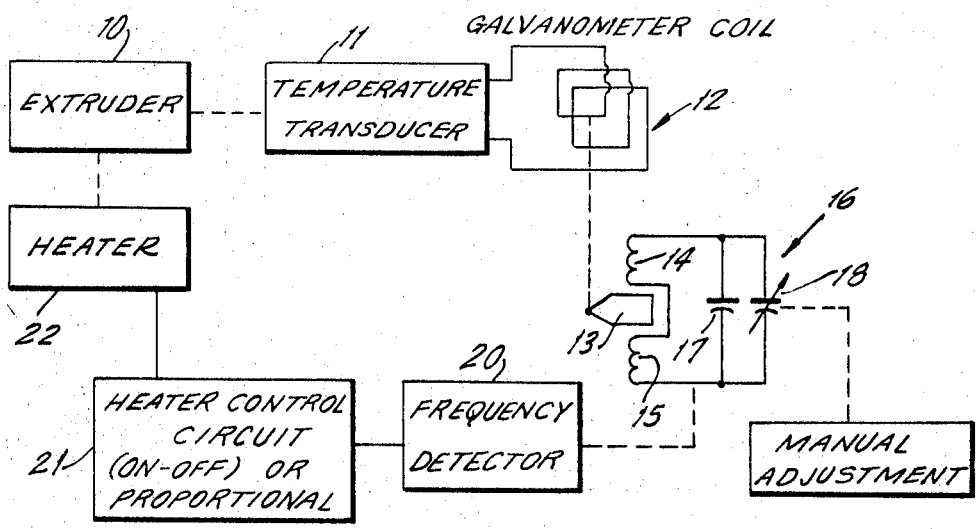
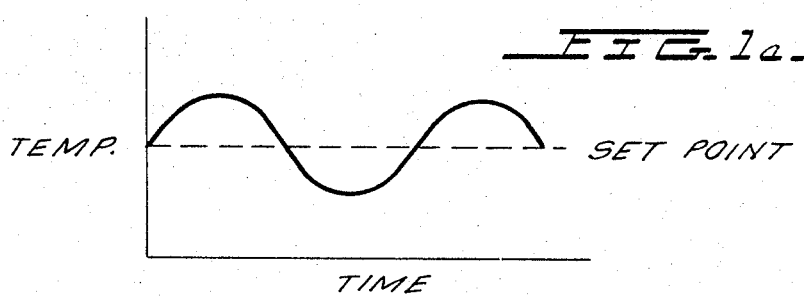
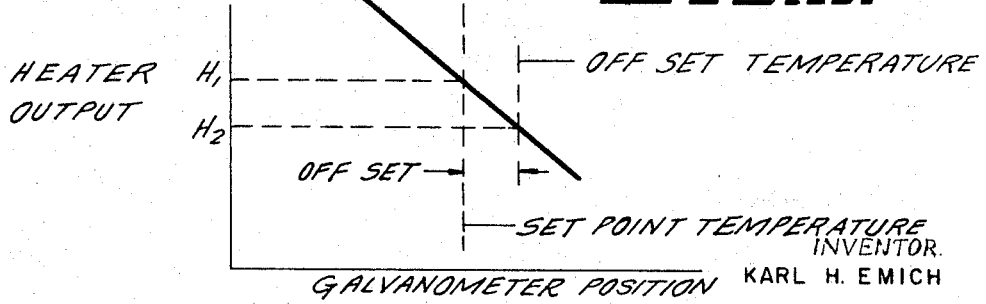
INVENTOR.
KARL H. EMICH
BY Allen & Meyer INVENTOR.
KARL H. EMICH
BY Allen L. Meyer 3,454,221
AUTOMATIC RESET FOR GALVANOMETER
CONTROLLER FOR USE WITH EXTRUSION
APPARATUS
Karl H. Emich, Decatur, Ill., assignor to National Distillers and Chemical Corporation, New York, N.Y., a corporation of Virginia
Filed Nov. 23, 1966, Ser. No. 596,677
Int. Cl. G05d 23/22, 15/00
U.S. Cl. 236—69                    3 Claims

ABSTRACT OF THE DISCLOSURE

A structure is provided for proportional type or time proportioning galvanometers which are used for controlling extruder temperatures which automatically corrects for off-set in the controller. This structure includes the provision of a reference means, such as a shade driven by a galvanometer pointer and interposed between a light beam and light-sensing device. The output of the photocell then controls the position of the manual off-set control within the standard galvanometer.

---

This invention relates to a galvanometer controller for extruders, and more specifically relates to a novel galvanometer controller for extrusion apparatus which operates in the proportional mode, and automatically resets to a predetermined set point.

In the extrusion of plastic material, it is well known that the temperature of the extrusion die, the extrusion barrels, and adapters, and the like must be held to some predetermined value which is given by the particular resins being extruded, the through-put of the extruder, and the like. Conventionally, galvanometer controllers are used to display this temperature, and to automatically control this temperature.

The commercially available galvanometer controller is provided with a temperature transducer which is connected to some suitably located zone on the extruder; a galvanometer movement; and an output circuit which delivers an electrical output signal related to the galvanometer pointer position. The galvanometer output circuit is then connected to a control which controls the amount of heat applied to the extruder system by an extrusion die heater.

This control takes different forms. One common form is an on-off type control where the extrusion heater is turned off when the galvanometer pointer is above some predetermined value (called the "set point temperature"), and is turned on when the temperature is below the set point temperature. A suitable manual adjustment is provided for adjusting the set point temperature.

This type of arrangement causes the extrusion die to have an average temperature equal to the set point temperature. However, it will be apparent that the actual die temperature will fluctuate above and below the set point temperature as the extrusion die heater is turned on and off. This temperature excursion around the set point temperature is undesirable since it causes fluctuations in the properties of the extruded material which may be intolerable in certain applications.

A second popular form of commercially available controller is similar structurally to the above noted on-off galvanometer controller except that the control mode is a "proportional" mode of operation. Thus, instead of turning the heater fully on or fully off as temperature varies from the set point temperature, the heater output is varied proportionally to difference between the measured galvanometer temperature and the set point temperature. Thus, theoretically, when the galvanometer indicates set point temperature, the heater output will be at 50%. If the measured extruder temperature now increases above the set point temperature, a proportional signal will be developed by the controller to proportionally decrease the heater output, thereby bringing the extruder temperature back toward its set point temperature. A manual control is again provided to manually set the set-point temperature.

In the above type of controller, there is a single linear relationship between pointer position and heater input. Thus, there is only a single discrete heater output available for any discrete galvanometer pointer indication (or extruder die temperature measurement). Therefore, while the proportional control mode eliminates the undesired temperature swing which is obtained in an on-off controller, it is subject to the serious problem of off-set. Off-set is the term given to the temperature difference between the desired set point temperature and the equilibrium temperature which the extruder actually assumes. Off-set comes about when there is a change in the control loop such that the specific heat output of the extruder heater at the set point temperature no longer is correct to maintain the set point temperature. For example, if the extruder is initially set up for a particular through-put and this through-put is increased for some reason, it will be necessary to supply more heat to the extrusion die to maintain the same set point temperature (since a greater mass of material must be heated). This additional heat can be supplied only by increasing the heater temperature, however, which would require the galvanometer controller indication to indicate a temperature greater than the set point. Therefore, the set point temperature will decrease below the set point value since the extruder heater will, in the zero corrected position, supply 50% of its power which is insufficient to heat the extrusion die to the set point temperature. Thus, the extrusion die will be held to a temperature lower than the set point temperature by the proportional control system when the through-put is increased. As mentioned above, this temperature change is called "off-set." Note that an opposite off-set would occur if through-put is decreased with the die operating hotter than set point temperature.

Any number of other factors which cause changes in the control loop would also cause an off-set such as changes in the resin characteristics or properties, changes in the control circuitry due, for example, to aging of components and changes in ambient temperature.

Present-day galvanometer controllers, using this proportional control concept, as well as those using time proportioning control, are provided with manual means for adjusting this off-set. Thus, an operator will observe the galvanometer indication and when it varies from the set point temperature, will manually adjust the galvanometer output signal so that the particular pointer position will call for more or less heater output.

The principle of the present invention is to provide a novel automatic off-set correction means for proportional-type or time proportioning galvanometer controllers. In accordance with the present invention, a galvanometer pointer position reference means is attached to the device and is connected by means of a servo mechanism to the manual off-set control means. Thus, when there is an off-set in the temperature indication, the galvanometer pointer will deviate from its set point position, thereby initiating an automatic adjustment from the galvanometer output signal to the extrusion heater which will cause the same galvanometer set point pointer position to cause more or less heat output of the extruder until the off-set temperature is brought back to the set point temperature.

This novel arrangement is further adapted such that it can be applied directly to presently commercially available galvanometer controllers of the proportional-type or time proportioning control. In one embodiment of the invention which has been found satisfactory, the galvanometer pointer has a flag or mask attached thereto which can be interposed in the light path between a light source and photosensing cell. When the galvanometer pointed is at the set point temperature, the galvanometer flag partially blocks the light path. When the photo-sensor is a photo-resistive type device, such as a cadmium sulfide cell, it will assume a resistance intermediate its fully illuminated low resistance and its dark resistance. If now the set point temperature changes in one direction, the flag will move to fully cut off the light source whereby the photosensing device assumes a very high resistance, thereby to initiate the operation of the servo system to re-position the galvanometer pointer so that the flag is moved back to its partially blocking position. If, on the other hand, the galvanometer pointer temperature indication is such that the flag is moved completely out of the light path, the photosensitive cell will assume its lowest resistance where again the servo system is actuated to adjust the galvanometer controller output and thus the heater output to bring the pointer position back to its set point temperature.

While this type structure can be continuously connected to the controller circuit, preferably the off-set correction circuit is only intermittently connected to prevent hunting and instability.

Accordingly, a primary object of this invention is to provide a novel proportional-type galvanometer controller for plastic extruders which automatically corrects for off-set.

Yet another object of this invention is to provide a novel structure which can be connected to presently existing plastic extruder galvanometer controllers which automatically corrects for off-set.

Yet another object of this invention is to provide a novel galvanometer controller for extruders which has no off-set and which is inexpensive and reliable.

These and other objects of this invention will become apparent from the following description when taken in connection with the drawings, in which:

FIGURE 1 is a block diagram illustrating a typical prior art type of galvanometer controller.

FIGURE 1a illustrates extruder die temperature as a function of time when the apparatus of FIGURE 1 operates in an on-off control mode.

FIGURE 1b illustrates the fixed relationship between heater output and galvanometer pointer position for the arrangement of FIGURE 1 when it is operated in a proportional control mode.

Figure 2:
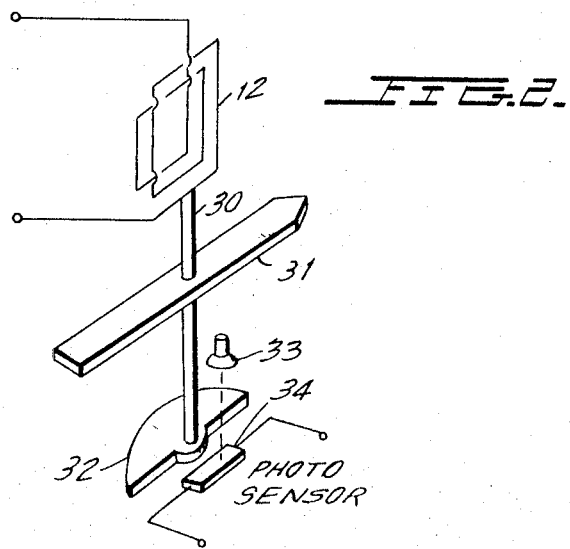
FIGURE 2 is a partially schematic perspective diagram illustrating a galvanometer movement as modified in accordance with the present invention.

Referring first to FIGURE 1, there is schematically illustrated therein a typical commercially available galvanometer controller for extruder application. Thus, a plastic extruder 10 is provided which must have its temperature held to some predetermined set point temperature. To this end, a suitable temperature transducer 11 such as a thermocouple is connected to extruder 10 with the output of transducer 11 connected directly to a galvanometer coil 12 of the galvanometer controller. The coil 12 is operatively connected to a suitable ferromagnetic member 13 which is movable between a pair of inductance coils 14 and 15 which are contained in an oscillating circuit 16. The position of member 13 will control the inductance of coils 14 and 15 and thereby change the resonant frequency of the circuit including coils 14 and 15 and capacitors 17 and 18. The capacitor 18 is a trimmer capacitor which is used to make slight adjustments in this oscillating frequency and serves as a manual off-set temperature adjustment. Obviously, capacitor 18 could be replaced by any suitable adjustable impedance device.

The oscillating circuit 16 is then used in any suitable frequency detector circuit 20, whereby changes in the oscillating frequency of circuit 16 from its resonant frequency are reflected in the output of circuit 20 to control the heater control circuit 21 which, in turn, controls the heat output of heater 22 which controls the temperature of extruder 10.

In operation, the temperature of extruder 10 is measured by transducer 11, with the output of transducer 11 causing the galvanometer coil to rotate its pointer and the member 13 to a particular position. If the temperature of extruder 10 is the temperature desired, then the coils 14 and 15 will have a predetermined inductance by virtue of the proper positioning of member 13 to impart a predetermined resonant frequency to tuning circuit 16.

The output of frequency detector 20 will then, for example, have some predetermined value and the heater control circuit 21 will not change the condition of heater 22. However, if the temperature of extruder 10 is below or above its set point, this will be reflected as a change in inductance of coils 14 and 15 which, in turn, changes the oscillating frequency of circuit 16, thereby to generate a change of output in frequency detector 20 calling for a change in the output of heater controller circuit 21, thereby adjusting heater 22 in a suitable manner.

As pointed out above, the circuit of FIGURE 1 can operate in two modes; in an on-off mode, or with proportional control. In the on-off mode, the heater control circuit 21 will call for the application of heat by heater 22 until the extruder 10 comes up to the desired temperature as reflected by the position of member 13 and the frequency of circuit 16. Once this temperature is reached, the heater control circuit turns off heater 22 so that the system begins to cool down. Once the extruder 10 has cooled for some predetermined length of time, the circuit is reactivated with the heater control circuit 21 again calling for the application of heat by heater 22 until member 13 moves to a position indicating that the galvanometer has reached its set point once again, whereupon the heater 22 is turned off, this sequence continuing with the temperature of extruder 10 continuously cycling about the set point of the galvanometer, as shown in FIGURE 1a. Thus, the on-off mode holds the average set point temperature, but the temperature swings about this average.

In the proportional-type of control, the output of heater control circuit 21 will call for increased or decreased amounts of heat for heater 22, depending linearly upon the position of member 13, as shown in FIGURE 1b. Thus, when the position of member 13 indicates that the extruder 10 is at its proper temperature, the output of heater 22 will be unaffected, whereas the positioning of pointer 13 indicating too high a temperature, or too low a temperature with respect to the set point, will cause less or more heat to be drawn from heater 22 by the heater control 21, tending to bring the temperature back to set point.

However if, for some reason, more or less heat is required from heater 22 to maintain set point temperature than value $H_1$ in FIGURE 1b, the equilibrium temperature will be off-set from set point temperature to the off-set temperature with heater 22 supplying heat value $H_2$ to maintain the new equilibrium temperature. This off-set has, in the past, been corrected by manual adjustment 23.

In accordance with the present invention, auxiliary means are connected to the galvanometer pointer to automatically effect the manual adjustment to compensate for any off-set due to changes in the control loop or in the operation conditions of the extruder.

Referring now to FIGURE 2, there is schematically illustrated therein the galvanometer coil 12 which is connected to the usual shaft 30 which has the galvanometer pointer 31 mounted thereon. In accordance with the invention, a light flag or shade 32 is additionally mounted on the shaft 30 with the shade 32 movable between a light source 33 and a photosensor 34 which could be of any desired type such as a cadmium-sulfide cell, or the like.

Figure 3:
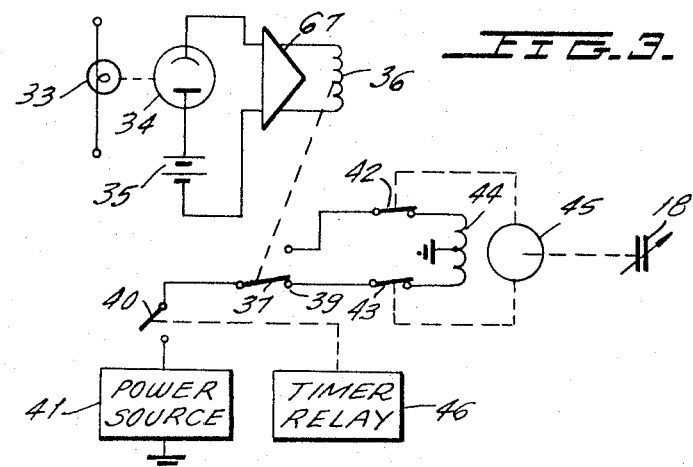
FIGURE 3 is a circuit diagram illustrating the manner in which the modified movement of FIGURE 2 can be used for automatic set point adjustment for the controller of FIGURE 1.

As shown in FIGURE 3, a photosensor 34 is then connected in series with a suitable voltage source 35, an amplifier 67 and a relay coil 36 which has a movable relay contact 37 movable between stationary contacts 38 and 39. Contact 37 is then connected in series with a contact 40 of a timer relay which shall be later described, and a power source 41. Contacts 38 and 39 are then connected in series with microswitches 42 and 43 and a center tapped coil 44 of a reversible motor 45.

The power source 41 is then used to drive the motor 45 in a direction determined by the state of energization of relay coil 36 and the position of contact 37. Microswitches 42 and 43 are operatively connected to the motor rotor to prevent excessive rotation thereof.

The rotor of motor 45 is then connected to the adjustable capacitor 18 (FIGURE 1) which is used to control the amount of off-set of the instrument due to inadvertent control loop changes. The contact 40 is then opened and closed at some predetermined repetition rate by timer relay 46. Timer relay 46 is used to only intermittently connect the regulator in the circuit to prevent excessive hunting and instability.

The set point of the instrument is determined by the location of the light source 33 and photosensor 34 which may be mounted on the same bracket. Lateral adjustment of this bracket will adjust the set point to a new position.

In operation, and assuming that there is an off-set in the instrument which brings shade 32 between light source 33 and photoresistive sensor 34, the cell 34 will assume a very high resistance. This will cause current flow through relay coil 36 to fall below the drop-out value of the relay, and contact 37 will engage contact 39 in a relay energization position.

Power can then be transferred from power source 41 (presuming contact 40 is closed) through contact 37, contact 39, microswitch 43 and the lower half of coil 44. This will cause motor 45 to rotate in such a direction as to adjust capacitor 18 in a direction to reduce the off-set of the pointer 31 from its set position.

In the event that the off-set of the instrument is in the opposite direction from that discussed above, the shade 32 will be removed from its interposing position in FIGURE 2, and photosensor 34 will be energized and its resistance greatly reduced. This will permit energization of coil 36 and the closing of contacts 37 and 39 in FIGURE 3 so that the upper portion of coil 44 is energized to cause rotation of motor 45 in an opposite direction and the adjustment of capacitor 18 in a direction once again designed to reduce the off-set to zero.

The above noted operation in FIGURE 3 occurs intermittently by virtue of the timer relay 46 which opens and closes contact 40 at a predetermined repetition rate.

Figure 4:
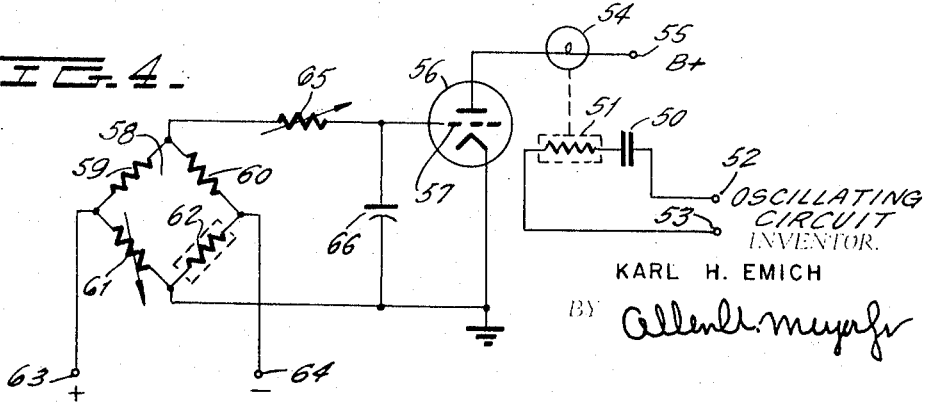
FIGURE 4 illustrates a second embodiment of the invention in which the servo motor of FIGURE 3 is replaced by a static control circuit.

FIGURE 4 illustrates a second embodiment of the invention where the control elements are static. Thus, in FIGURE 4, the trimmer circuit equivalent to trimmer capacitor 18 of FIGURES 1 and 3 is replaced by capacitor 50 connected in series with a photoresistive element 51. The terminals 52 and 53 of this trimmer circuit are then connected in a suitable oscillating circuit whereby a change in the resistance of photoresistor 51 will cause a change in the tuned frequency of the oscillating circuit. A light source 54 is then disposed to shine on photoresistor 51 and is connected in series with a source of voltage connected to terminal 55 and in series with triode 56. The intensity of light source 54, which is contained in the plate circuit of triode 56 is then controlled by the grid control voltage connected to the grid 57 of triode 56. The grid control circuit then includes a Wheatstone bridge 58 composed of fixed resistors 59 and 60, an adjustable resistor 61, and a photoresistor 62 which is positioned in FIGURE 2 in the place of photosensor 34. A D-C voltage source is then connected to terminals 63 and 64 of the Wheatstone bridge with the bridge output connected in series with adjustable resistor 65 and grid capacitor 66.

In operation, as more or less light shines upon photoresistor 62, the bridge will go from a balanced position, corresponding to half-shading by flag 32, to a first unbalanced position, related to its dark resistance when it is fully shaded by flag 32 to its low fully illuminating condition, corresponding to the removal of flag 32 from between source 33 (FIGURE 2) and the photoresistor 62. Therefore, the grid voltage of tube 56 will vary over a range including an intermediate point corresponding to a balanced bridge condition. This, in turn, will vary the light intensity of source 54 and thus the resistance of photoresistor 51 over a range corresponding to the intensity of source 54 and thus the position of flag 32. The oscillating circuit, in the standard galvanometer controller, will then be tuned over this range whereby instrument off-set, as determined by the position of flag 32, will be automatically corrected by the new tuning of the circuit connected to terminals 52 and 53 and thus an appropriate shift in the regulating characteristic of FIGURE 1b.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A galvanometer controller having automatic off-set correction control comprising, in combination: a temperature transducer; a galvanometer movement including a coil connected to said temperature transducer and a pointer shaft rotatable with said coil; an output circuit for generating an electrical signal related to the position of said pointer shaft; and connection means connected from said pointer shaft to said output circuit for varying the output of said output circuit as said pointer shaft changes its angular position; an adjustable impedance means connected to said output circuit for adjusting the output thereof independently of said connection means; a second means connected to said pointer shaft for generating an electrical output signal related to the movement of said pointer shaft from a set point temperature position; and servo means connected between said second means and said adjustable impedance means for automatically adjusting the output of said output circuit by adjusting said adjustable impedance means until said pointer shaft assumes said set point temperature position.

2. The combination of claim 1 which further includes an intermittent connection circuit in said servo means for intermittently activating and deactivating said servo means.

3. The combination of claim 1 wherein said second means includes a flag connected to said pointer shaft and a fixed light source and photosensor; said flag partially interposed between said light source and photosensor when said pointer shaft is at its set point temperature position; said flag respectively substantially fully blocking or fully removed from between said light source and photosensor when said pointer moves to either side respectively of its said set point temperature position.

References Cited

UNITED STATES PATENTS

| | | | |
|---|---|---|---|
| 2,136,628 | 1/1935 | Gilbert | 236—69 |
| 2,218,502 | 10/1940 | Breitenstein | 236—69 |
| 2,508,988 | 5/1950 | Bradley | 165—30 |
| 2,721,729 | 10/1955 | Van Riper. | |
| 2,760,046 | 8/1956 | Rothacker | 219—20 |
| 2,832,879 | 4/1958 | Van Riper | 219—20 |
| 3,218,671 | 11/1965 | Justus et al. | |

WILLIAM J. STEPHENSON, *Primary Examiner.*

U.S. Cl. X.R.

18—2; 219—502; 324—65